United States Patent [19]
Svilans

[11] 3,782,857
[45] Jan. 1, 1974

[54] DEVICE FOR AIR AND FLUID ACCELERATION AND METHOD OF MAKING SAME

[76] Inventor: Olgerts Janis Svilans, 4508 W. Schubert Ave., Chicago, Ill. 60639

[22] Filed: Aug. 26, 1970

[21] Appl. No.: 67,160

[52] U.S. Cl.................................. 416/236, 416/243
[51] Int. Cl............................................ F04d 29/38
[58] Field of Search.................... 416/223, 235, 236, 416/238, 243, 202, 228

[56] References Cited
UNITED STATES PATENTS

| | | | |
|---|---|---|---|
| 1,758,560 | 5/1930 | Currie | 416/202 |
| 3,609,060 | 9/1971 | Angel | 416/236 X |
| 1,161,701 | 11/1915 | LeMay | 416/235 |
| 2,098,107 | 11/1937 | Preston | 416/214 |
| 2,978,040 | 4/1961 | Wirkkala | 416/235 X |
| 1,413,296 | 4/1922 | Spreekmeester | 416/236 X |

FOREIGN PATENTS OR APPLICATIONS

| | | | |
|---|---|---|---|
| 9,930 | 1891 | Great Britain | 416/236 |
| 23,264 | 1911 | Great Britain | 416/235 |
| 871,677 | 1/1942 | France | 416/243 |
| 24,066 | 9/1915 | Great Britain | 416/235 |

Primary Examiner—Everette A. Powell, Jr.
Attorney—Roger A. Schmiege

[57] ABSTRACT

A rotational device adapted to act in a fluid medium and provide a reaction therewith including a plurality of wing-like blades, said blades being generally disposed in a plane perpendicular to the axis of rotation and having outer radial portions generally disposed in a direction parallel to said axis to prevent any fluid medium from escaping radially rather than travelling axially along the axis of rotation of said device. The invention further comprises a method for making a wing shape for a rotational device of this character.

4 Claims, 7 Drawing Figures

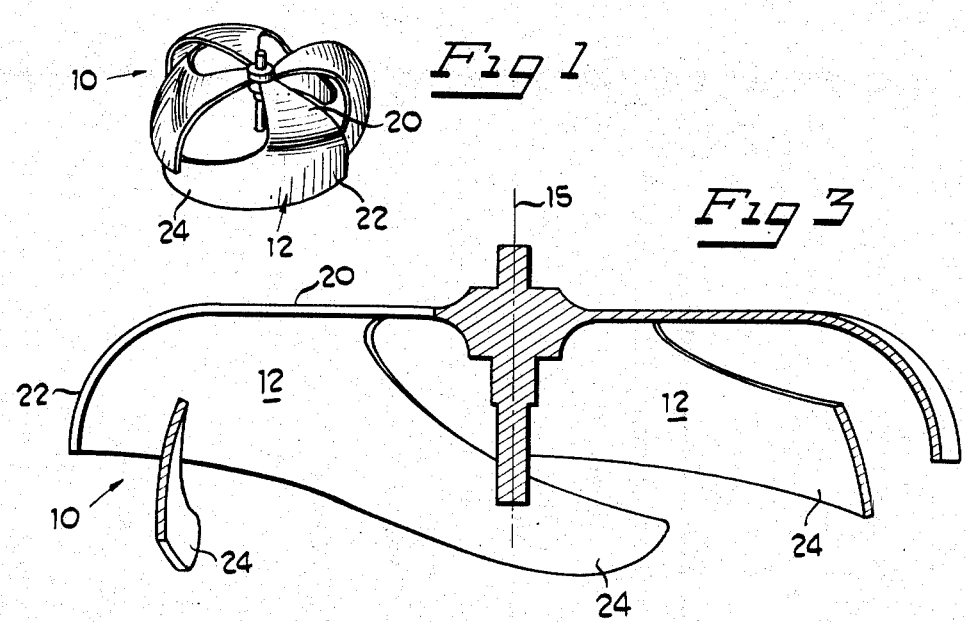
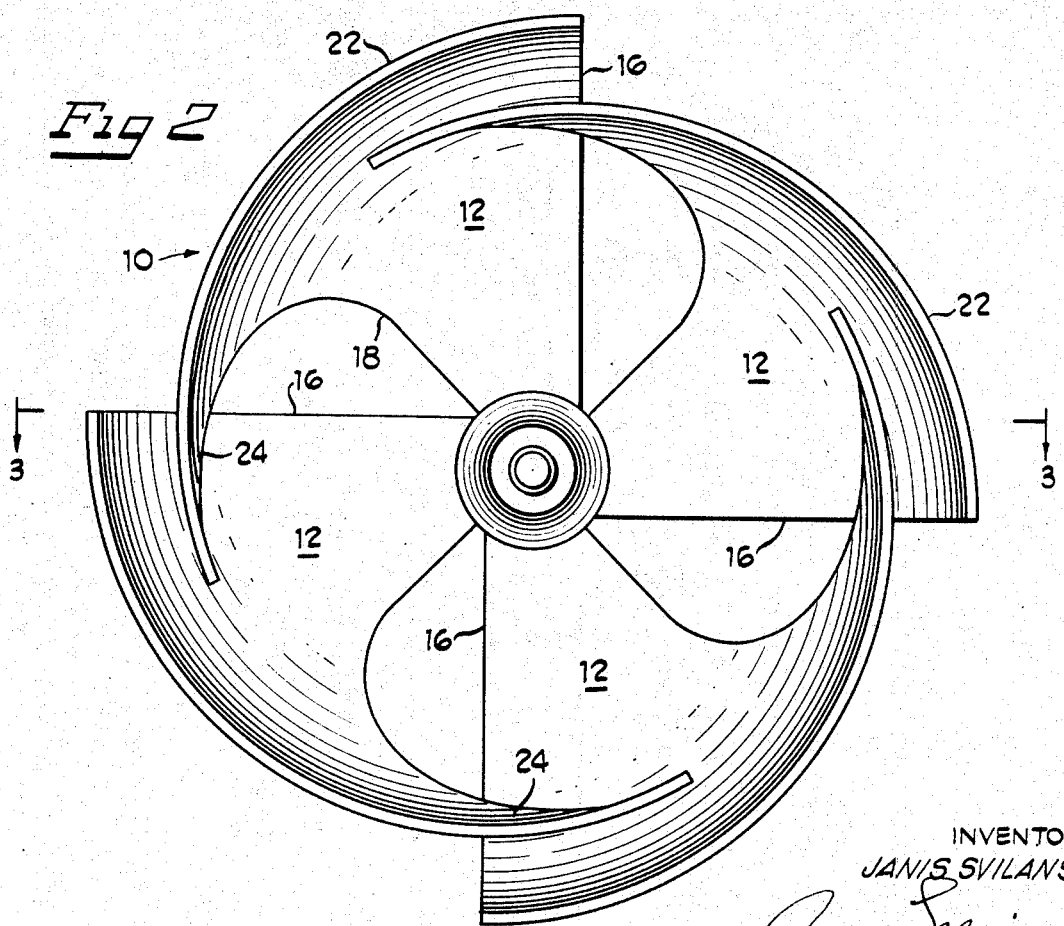

INVENTOR
JANIS SVILANS 3,782,857

DEVICE FOR AIR AND FLUID ACCELERATION AND METHOD OF MAKING SAME

SUMMARY OF INVENTION

Previously known forms of rotational devices for reaction with fluids, known as wings or propellers, are such that the mass of fluid such as air, for example, can escape to the sides or radially as well as to the rear of the device. By vector analysis it can be shown that with regard to a propeller only those vectors of force which are directed diametrically opposite to the direction of flight of the vehicle, contribute to the acceleration of the vehicle. Therefore commonly known forms of propellers are quite inefficient due to escape of fluid radially. The present invention overcomes this inefficiency by directing the whole stream of air or other fluid in a direction opposite to the direction of flight. The novel rotating device accomplishes this direction of the fluid stream by having the radially outward edges nearly parallel to the rotational axis of the device and are curved in the opposite direction to the direction of flight or air intake.

BRIEF DESCRIPTION OF DRAWINGS

FIG. 1 is a perspective view of a rotational device embodying the principles of the present invention;

FIG. 2 is a planar view of the lower side of the rotational device of FIG. 1;

FIG. 3 is a sectional view taken along the line 3—3 of FIG. 2;

DETAILED DESCRIPTION OF DRAWINGS

Figure 4:
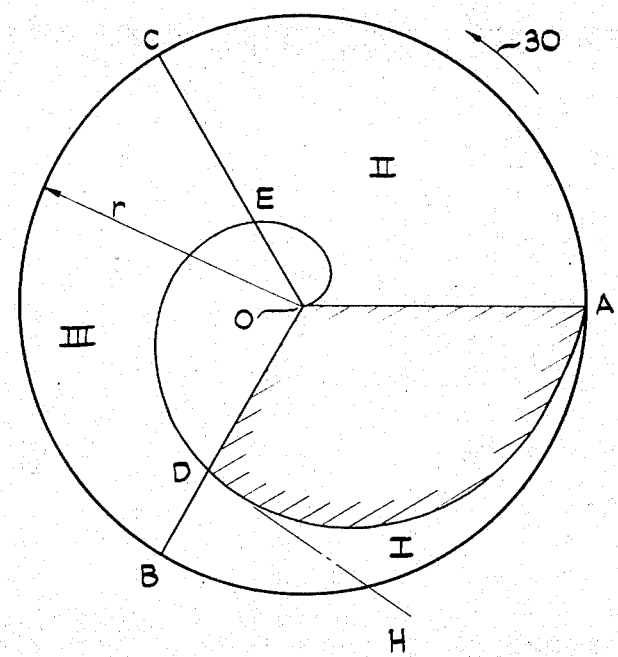
FIG. 4 is a geometric development of a curve used in the making of the rotational device of FIG. 1.

Referring to FIGS. 1, 2 and 3 a rotational device is illustrated consisting of four surfaces or wings attached to a common rotating axis. The rotational device 10 has, for example, four wings 12, the device may have two, three or more than four wings without affecting the basic principles outlined herein.

The rotatinal device 10 is rotatable about a central axis 15. Each of the wings 12 has a leading edge 16 and a trailing edge 18. Each wing 12 further includes a generally radially extending portion 20 and a generaly longitudinally extending portion 22. Portions 22 extend generally parallel to the rotational axis 15. Portions 22 also have a trailing section 24 which extends such as to overlap the leading edge 16 of the next wing 12.

The wings 12 comprise surfaces formed in accordance with a method to be described. The geometry of the surface may be based, for example, on the spiral curve of Archimedes defined by $\rho = k\theta$, where $\rho$ and $\theta$ are the polar coordinates, $k$ is a constant.

Adherence to this particular spiral curve is required only as far as dictated by the aerodynamical principle of this invention. In other words, the shape of the rotating surfaces is such that the centrifugal forces acting on the rotationally accelerated fluid particles in passing through the device are overcome by imparting a gradual momentum at the point of contact with the surface which directs them back to the center and outwards of the device in the direction opposite to that of the incoming fluid. Thus, other geometries based, for example, on the log-spiral curve $\rho = \exp(k\theta)$, are possible, and, moreover, the sections of importance can be made to resemble the spiral of Archimedes after proper translation of the origin.

Figure 5:
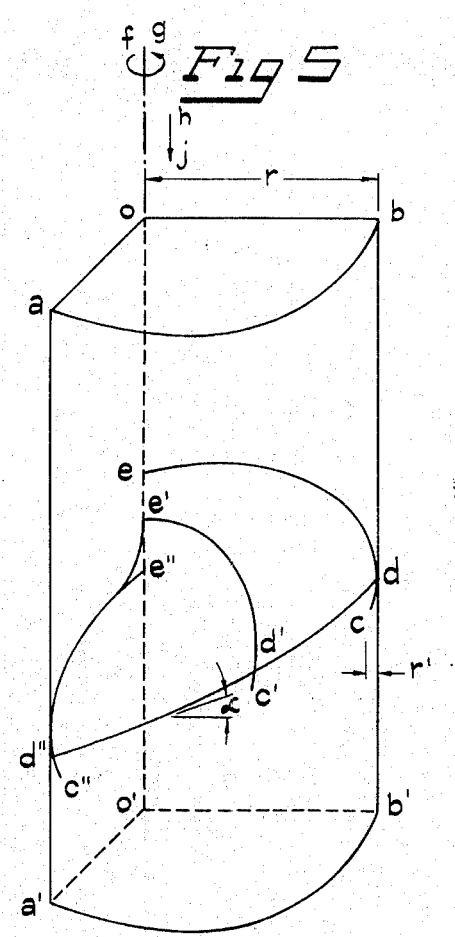
FIG. 5 is a geometric development of a wing surface of the rotational device of FIG. 1.

FIGS. 4 and 5 show the development of the wing geometry of the rotational device based on the preferred spiral of Archimedes.

The circle shown in FIG. 4 represents the contour of the circle of radius $r$ formed by the rotating wings of the device with the axis of rotation O perpendicular to the plane of the drawing. The circle is divided into three equal sectors I, II and III. The number of the sectors is equal to the number of the wings which would be three as developed in FIG. 4. The direction of rotation, as viewed from the side of the inflowing fluid, is chosen to be counterclockwise and is indicated by the arrow 30. With the line OA coinciding with the $\theta = 0$ line, a spiral $\rho = (r/2\pi)\theta$ that opens in the direction of rotation is drawn. The area AOD thus formed in sector I and shown crosshatched represents a plan view of a surface of one of the wings of the rotational device.

Figure 6:
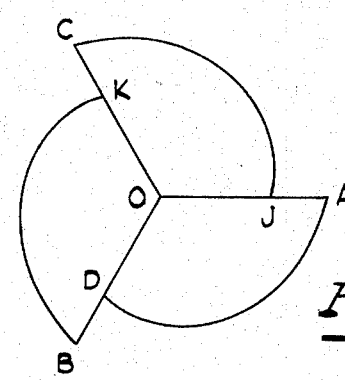
FIG. 6 is an illustration of the combination of a number of surfaces made as in FIG. 5 to comprise a rotational device.

Plan views of the remaining two wings are found by similar construction. The final result is the plan view of a three-winged rotational device shown in FIG. 6. Again, the direction of rotation is counterclockwise when viewed from the side of the inflowing fluid. The lines AJO, BDO and CKO represent the leading edges of the three wings. Were it desirable to construct the device such that the direction of rotation is clockwise when viewed from the side of the inflowing fluid, the plan view would be the mirror image of the view shown in FIG. 6.

A pictorial view of the development of the wing surface of the rotational device is shown in FIG. 5.

When the crosshatched area ADO of FIG. 4, representing the plan view of the wing, is moved in space along the orthographic projection lines, the lines AO, OD and DA form the surface of a solid $aobb'a'o'$ shown in FIG. 5. A working line line $d''d'd$ is drawn on the spiral-curved portion $abb'a'$ of the surface of the solid in such a manner that the slope of the line remains constant at an angle $\alpha$ with respect to the plane of the base area $a'o'b'$ (or the plane of the top area $aob$). The line $d''d'd$ represents the line of tangency of the wing surface S with the spiral-curved portion $abb'a'$ of the surface of the solid $aobb'ao'$. To form the surface of wings 12 as shown in FIG. 5, the line EDH shown in FIG. 4 and consisting of the spiral section ED of sector II and the tangent-to-the-spiral extension DH is used. The line EDH of FIG. 4 is shown in three different radial planes by the lines $cde$, $c'd'e'$ and $c''d''e''$ in FIG. 5. The endpoints $c,c',c''$ of these lines correspond to the endpoint E of the line EDH, and, similarly, the endpoints $e,e',e''$ correspond to the endpoint H. The position of the line $cde$ with respect to the surface of the solid $aobb'a'o'$ is such that a. the endpoint $c$ is inside the solid $aobb'a'o'$ and a distance $r_1$ of approximately one-fiftieth of the radius $r$ away from the spiral-curved surface $abb'a'$, b. the line cde is tangent to the spiral-curved surface $abb'a'$ at the point $d$ on the surface line $d''d'd$, c. the endpoint $e$ is on the line of the axis of rotation $oo'$.

Beginning with the curve represented by line *cde* in the position illustrated in FIG. 5 with respect to the solid *aobb'a'o'* and revolving the curve around the axis of rotation *oo'* within the limits of the same solid while keeping the point of tangency of the curve *cde* in position to follow the working line *d"d'd*, the wing surface is formed.

To summarize the above, the improved method of forming a wing surface for the rotational device 10 comprises the steps of a. forming a part cylindrical like solid by means of moving a cross-sectional area having one surface thereof shaped by a predetermined form of spiral along a vertical axis b. placing a working line of predetermined slope with respect to horizontal along said one surface c. locating a predetermined form of spiral curve within said solid so that it is tangent to said one surface at a point coinciding with said working line d. and forming said air foil by rotating said curve about said vertical axis while making said point of tangency follow said working line.

Figure 7:
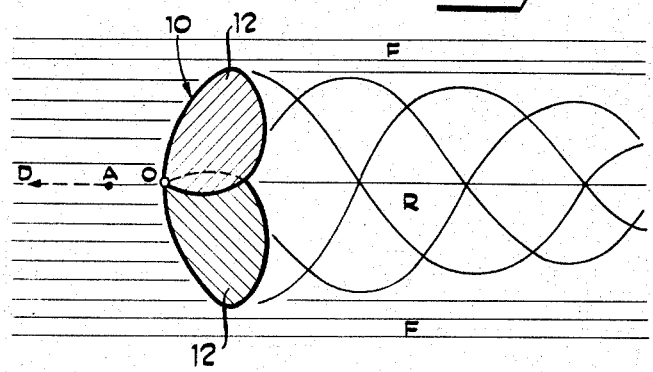
FIG. 7 is an illustration of fluid flow with respect to the rotational device of FIG. 1.

The new device accomodates within itself the fluid streaming past, and this part of the fluid escapes all to the rear of the device creating a spiralic (and not a disorderly, turbulent) stream or wake, as illustrated in FIG. 7. In nature, the extraordinary aerodynamic stability of a spiralic motion can be observed in a cyclone or a tornado. In a similar manner, the spiralic stream of fluid created by the rotating device of this invention sucks in the air from the front of the vehicle and accelerates it virtually without peripheral losses to the rear, thus causing the forward movement of the vehicle. The spiralic motion of a tornado and the spiralic motion of the fluid escaping the device of this invention are similar; both streams have a tendency of maintaining their stability in the fluid medium, in contrast to simple, linear, laminar motion, which has a tendency at its borderlines with the motionless medium to turn into a turbulent motion and thus dissipate its energy.

Referring to FIG. 7, the fluid flow lines F approaching the rotating device 10 from the direction DAO to a very large extent enter the inside of the device and escape in the form of the spiralic flow R, which does not cause any peripheric streaming (as it happens in the case of known propellers) and hence does not disturb to any significant degree the surrounding layers F of the fluid. In this manner a minimum loss of useful energy by centrifugal or peripheric streaming is achieved.

From the foregoing it will be apparent that the rotational device for air and other fluid acceleration which is the subject of this invention, reduces such losses of energy of rotation as are characteristic of the known air foils and propellers. The reduction of these energy losses is accomplished by a new aerodynamic principle whereby the novel rotating device directs the whole stream of air or other fluid with which it comes into contact in the directiondiametrically opposite to the direction of flight (or, for stationary air accelerators, in the direction diametrically opposite from the direction of the intake of air). The fluid such as air being accelerated by the novel rotating device of this invention streams backward partly in the form of a laminar motion and partly in a spiralic motion with respect to the surrounding (on the average, stationary) medium of the fluid, but the new principle is characterized by the fact that the losses of this flow to the sides, at the angle of about 90° with the direction of flight (or with the direction of air intake) are significantly reduced. This is accomplished by the fact that the ends or edges of the new rotating device asymptotically approach or reach or may cross over the walls of an imaginary cylinder the axis of which is the axis of the novel rotating device. In other words, the extreme ends or edges of the novel rotating device of my invention are parallel or almost parallel with the axis of the rotating device, and they are curved in the opposite direction of the direction of flight (or opposite to the direction of air intake).

Various features of the invention have been particularly shown and described; however, it should be obvious to one skilled in the art that modifications may be made therein without departing from the scope of the invention.

I claim:

1. A rotational device adapted to act in a fluid medium to provide a reaction therewith including a plurality of wing-like blades, said blades being generally disposed in a plane perpendicular to the axis of revolution of the device, said blades being curved to form a generally cup-shaped structure opening in a direction toward the flow of fluid through said device and further each including outer radial portions generally disposed in a direction parallel to said axis of revolution whereby said fluid medium will move in a direction parallel to said axis of revolution and movement of any of said fluid medium in a radial direction generally perpendicular to said axis is resisted by said outer radial portion, said outer radial portions of said blades being in an overlapping relationship with respect to one another whereby escape of said fluid medium in said radial direction is minimal, said outer radial portion of each of said blades in the area of said trailing edge being displaced radially inwardly a substantial amount with respect to the outer radial portion of the blade which is overlapped, and said trailing edge of each of said blades overlapping the next blade by a least one fifth of the circumferential extent of said next blade, and said blades have a generally straight line leading edge and a spirally curved trailing edge.

2. A rotational device as claimed in claim 1 wherein each of said blades comprises an air foil having a particular shape defined by the product of the following developmental steps:

a. forming a part cylinderical like solid by means of moving a cross-sectional area having one surface thereof shaped by a predetermined form of spiral along a vertical axis b. placing a working line of predetermined slope with respect to horizontal along said one surface c. locating a predetermined form of spiral curve within said solid so that it is tangent to said one surface at a point coinciding with said working line d. and rotating said curve about said vertical axis while making said point of tangency follow said working line to form said air foil shape.

3. A rotational device as claimed in claim 2 wherein said predetermined form of spiral curve stated in step (c) is a log-spiral curve defined by the formula $\rho = \exp(k\theta)$ wherein $\rho$ and $\theta$ are the polar coordinates.

4. A rotatinal device as claimed in claim 2 wherein said predetermined form of spiral curve is an Archimedes type of spiral defined by the formula $\rho = k\theta$ where $\rho$ and $\theta$ are the polar coordinates and $k$ is a constant.

* * * * *